(12) United States Patent
Willard, Jr. et al.

(10) Patent No.: US 6,374,888 B1
(45) Date of Patent: Apr. 23, 2002

(54) TIRE BEAD CORE AND FILLER CONSTRUCTION

(75) Inventors: Walter Lee Willard, Jr.; James Milo Endicott, both of Greenville; Jeffrey Scott Craddock, Simpsonville, all of SC (US)

(73) Assignee: Michelin Recherche et Technique S.A., Grange-Paccot (CH)

( * ) Notice: Subject to any disclaimer, the term of this patent is extended or adjusted under 35 U.S.C. 154(b) by 0 days.

(21) Appl. No.: 09/462,230

(22) PCT Filed: Jun. 1, 1998

(86) PCT No.: PCT/US98/11074
§ 371 Date: May 18, 2000
§ 102(e) Date: May 18, 2000

(87) PCT Pub. No.: WO98/56604
PCT Pub. Date: Dec. 17, 1998

Related U.S. Application Data

(60) Provisional application No. 60/051,617, filed on Jun. 13, 1997.

(51) Int. Cl.[7] .................. B60C 15/06; B60C 17/06; B29D 30/20
(52) U.S. Cl. ............... 152/517; 152/541; 156/111; 156/123; 156/132; 156/135
(58) Field of Search ............... 152/517, 539, 152/540, 541, 543, 546; 156/111, 123, 130.7, 132, 133, 135

(56) References Cited

U.S. PATENT DOCUMENTS

| | | | | |
|---|---|---|---|---|
| 3,682,223 A | | 8/1972 | Simpson | 152/362 |
| 4,007,069 A | | 2/1977 | Takayanagi et al. | 156/123 |
| 4,046,183 A | | 9/1977 | Takahashi et al. | 152/362 |
| 4,120,338 A | | 10/1978 | Martain | 152/354 |
| 4,227,563 A | * | 10/1980 | Grosch et al. | 152/541 |
| 4,508,153 A | | 4/1985 | Tanaka et al. | 152/362 |
| 4,790,364 A | | 12/1988 | Lobb et al. | 152/454 |
| 4,842,682 A | | 6/1989 | Iwata et al. | 156/130 |
| 5,033,524 A | | 7/1991 | Ohtsuka | 152/542 |
| 5,164,029 A | | 11/1992 | Oohashi et al. | 152/546 |
| 5,215,612 A | * | 6/1993 | Motomura et al. | 156/130.7 |
| 5,380,384 A | * | 1/1995 | Tokunaga et al. | 156/111 |
| 5,427,166 A | * | 6/1995 | Willard, Jr. | 152/454 |

* cited by examiner

Primary Examiner—Geoffrey L. Knable
(74) Attorney, Agent, or Firm—Martin Farrell; Robert R. Reed; Alan A. Csontos

(57) ABSTRACT

The run-flat tire (10) of this invention includes spaced apart bead areas (30) having a unique design to include first (34) and second (36) bead fillers adjacent a bead core (32). The second bead filler (36) is bounded by the first bead filler (34) and bead core (32). The method for manufacturing the tire to eliminate voids at the bead core (32) of the cured tire is also provided. The bead fillers are made to be resilient so that the tire can be easily mounted on a rim, particularly improving the ability to mount a run-flat tire (10) on a rim (80). The bead core (32) and fillers (34, 36) are designed for helping to sustain the run-flat tire (10) on the rim (80) with a loss of inflation pressure and to improve the running performance of the tire.

12 Claims, 5 Drawing Sheets

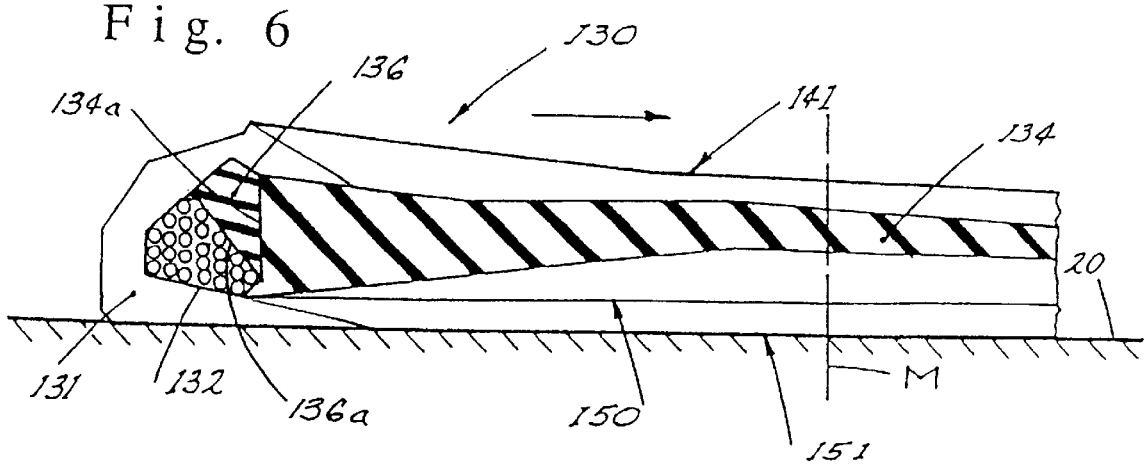
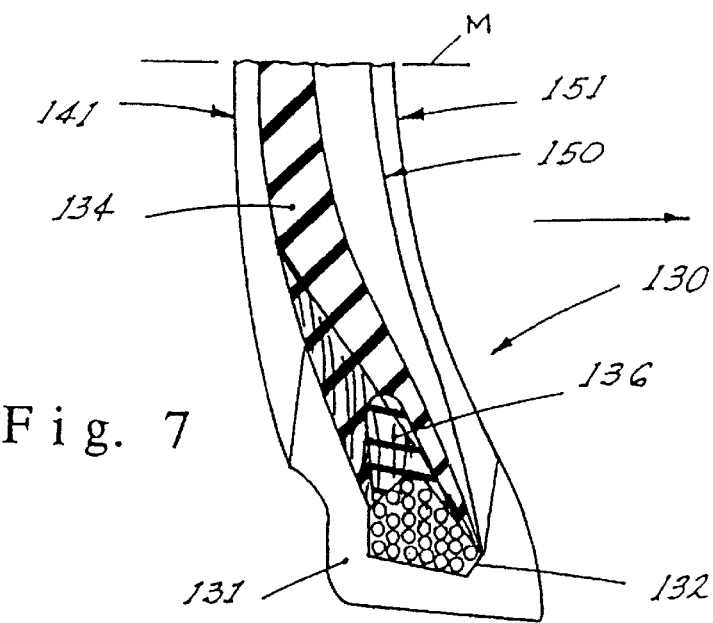

TIRE BEAD CORE AND FILLER CONSTRUCTION

This application claims the benefit of U.S. Provisional Application No. 60/051,617, filed Jun. 13, 1997.

BACKGROUND OF THE INVENTION

1. Field of the Invention

This invention relates to radial pneumatic tires used for vehicles, and more particular to the design of the lower sidewall and bead area of a run-flat tire to improve the process for manufacturing the tire, mounting the tire on a standard rim and the running performance of the tire on a vehicle.

2. Description of the Art

The building of a tire by conventional means includes initially laying green rubber components one at a time around a cylindrical tire building drum to build-up the carcass and bead portions of the tire. The green tire is then removed from the cylindrical drum and expanded into a toroidal shape before the crown belt plies and tread rubber are added to complete the completing of the green tire ready to be cured in a curing mold. The result is that components that end up in the sidewall of the tire have been rotated approximately 90 degrees during transition going from the cylindrical shape to the toroidal shape during the manufacturing process. The rotation of both the sidewall components and the bead area components about the bead core is typical of one of the possible means of making a tire. The bead core is generally of a high torsional rigidity and does not rotate during this process. This rotation process must be carefully controlled. The rotation problems can be more difficult with the addition of sidewall stiffening members when manufacturing run-flat tires. The need exists in the art to improve the ability to rotate the bead area of the green tire when going from the cylindrical shape to the toroidal shape during the tire building process.

Processes for making a green tire are disclosed in U.S. Pat. Nos. 4,007,069; 4,842,682; 5,215,612; and 5,380,384. These processes show variations in how the toroidal shape is obtained from the cylindrical shape and sidewall components are later added to the toroidal shape by an additional tire building step. These processes are used with green tire building step. These processes are used with green tires having a single bead filler.

The cured tire is mounted on a rim of a vehicle by mechanical means so that the tire is sealed against the rim. The rim transfers the weight of the vehicle through the tire to a ground surface. The mounting of the tire can be difficult as the interface pressure between the tire and the rim must be adequate to maintain inflation pressures in the tire and keep the tire seated on the rim. The interface pressure during mounting becomes very critical with run-flat tires as a result of the stiffer sidewalls and the requirement for the run-flat tire to remain on the rim with a loss of inflation pressure. The bead areas including the bead cores and bead fillers along with the tire sidewalls provide resistance for mounting the tire on the rim. Some tires also include additional stiffening plies such as chafers, flippers and the like that influence the mounting of the tire on the rim. Typical stiffening plies are disclosed in U.S. Pat. Nos. 4,790,364 and 5,033,524. These plies further increase the tire's radial stiffness when mounting the tire on the rim. A need exists in the art to have better compliance or resilience of the bead filler adjacent the bead core so that the tire can be easily mounted, especially when mounting a run-flat tire on a rim.

The shape, dimensions and material properties of components in the lower sidewall and bead of a tire have a direct effect on the ability to mount the tire on a rim. The tire can be designed to have a compliant shape, dimensions and material properties. The material properties of the filler can be made to be different near the bead core than radially outward in the sidewall to facilitate an efficient tire fabrication process and make the tire easy to mount on a rim. The disclosures of U.S. Pat. Nos. 4,046,183; 4,120,338; 4,508,153; and 5,164,029 and Japan Patent No. 5-178037 illustrate the use of bead fillers having two parts; being one part adjacent a bead core and another part extending into the sidewall area. These two-part bead fillers use different size, shape and material properties for each of the two parts. The bead areas of many of these references also include additional reinforced plies placed adjacent to the bead fillers to improve durability and strength of the bead region of the tire. U.S. Pat. No. 3,682,223 discloses softer cushion strips added between a harder wedge shaped apex strip and the radial wire carcass for improving durability of the tire in the bead area. The need remains in the art to simplify the use of two-part bead fillers in the bead area while maintaining their advantages.

The design of the bead area of the tire is known to have a direct effect on the ride comfort and handling performance of a vehicle. Lateral movements of a vehicle are directly influenced by the lateral stiffness of the tire. The tire's lateral stiffness is greatly influenced by the bead area design. Bending resilience of the lower bead area of the tire with respect to the rim is a major factor in the lateral stiffness of the tire. The radial stiffness of a tire also has a direct affect on the ride comfort of the vehicle.

The tire design must satisfy a large number of different criteria, some of the criteria being known to be conflicting with other criteria, so that designing a tire with due consideration to both manufacturing issues and performance features remains a challenge. This is especially true when a run-flat tire is being designed which can also run with a loss of inflation pressure.

The need exists in the art to build a green tire having a bead area which can easily be rotated about the bead core when manufacturing the tire and not only provides a cured tire which can be easily mounted on a rim to seat on the rim as discussed above, but also has radial and lateral stiffness properties for improved vehicle handling and ride comfort.

Accordingly, one object of this invention is to provide a method for forming a green tire using a tire building drum such that first and second bead fillers can be laid down in a flat configuration on a tire building drum then positioned radially outward of a bead core during a shaping stage.

Another object of the invention is to provide a tire having an annular bead core in combination with bead filers so that the cured tire can be easily mounted on a rim of a vehicle without excessive inflation pressures so that proper contact is made with the rim, while providing a vehicle with good ride comfort and handling performance.

Yet another object of the present invention is to provide a tire having annular bead cores and bead filers, when designed as a run-flat tire, which has a lower sidewall which is resilient and deforms to the shape of a rim flange during loss of inflation pressure.

A further object of the present invention is to simplify the design of a run-flat tire to reduce the number of difference rubber components used in the bead area when manufacturing the run-flat tire.

SUMMARY OF THE INVENTION

In one variation, the invention provides a run-flat tire easily mounted on a rim of a vehicle for normal operation of the vehicle. The tire is useful for many vehicles including passenger cars, light trucks, trucks and the like. The tire has a tread portion for contacting a ground surface and a belt package with belt plies interior to the tread for support of the tread. A plurality of carcass layers positioned interior to the belt plies extend between spaced apart annular beads. The tire has a pair of sidewall portions each extending radially inward from shoulders at lateral edges of the belt package to the annular beads. The spaced apart beads have a unique design including bead areas with first and second bead fillers above the bead cores including the second bead filer with a different hardness and having a gum-drop shape which is enclosed by the bead core and the first bead filler. The method of forming an assembled green tire during the tire building process is also unique to this invention.

The radial pneumatic tire of this invention is for mounting on a rim of a vehicle to sustain vehicle loads by contacting a ground surface at a contact patch of the tire. The tire comprises inner sidewall components including an innerliner and at least one carcass layer disposed to the interior of the tire to retain an inflation pressure within the tire when mounted on the rim and to provide a radial carcass structure under tension when the tire is inflated. A pair of spaced apart annular beads is interconnected by the at least one carcass layer, wherein each one of the annular beads has a bead core, first and second bead fillers and rim interface components for sustaining the tire on a rim when mounted thereupon. The bead core has an annular coil of wire filaments forming a polygonal cross-section having a predetermined tensile strength. The annular beads are spaced apart an axial distance corresponding to a width of the rim on which the tire is to be mounted. Outer sidewall components have sidewall rubber portions and at least one outer carcass layer. The at least one outer carcass layer has a lapping arrangement with at least one inner carcass layer; as one or more of the carcass layers wrap around the bead core. The first bead fillers are each disposed radially from a respective bead core to extend radially into a sidewall area of the tire and are bounded on one side by at least one inner carcass layer and at least one outer carcass layer. The second bead filer is in the form of a gum-drop having a radial inner side adjacent to the bead core and bounded by the first bead filler on the other sides of the second bead filler. A crown portion of the tire has a belt package radially outward of the inner sidewall components and a tread for making contact with the ground surface at the contact patch for supporting the vehicle.

The present invention includes a unique method for forming a tire in a tire building process from a green tire using a cylindrical tire building drum. The method comprises the following steps. The first step includes providing inner sidewall components and rim interface components of the green tire including an innerliner and at least one inner carcass layer and placing the inner sidewall components and the rim interface components around an outer surface of tire building drum. The rim interface components including blastomeric rubber portions and turn-up portions of the at least one carcass layer. In a second step the method includes providing a pair of bead cores having an annular coil of wire filaments and placing the bead cores axially spaced apart in a position radially outward of respective rim interface components, and providing a pair of first bead fillers having an axially elongated and tapered cross-sectional shape and placing each one of the first bead filers around the outer surface of the building drum with a short axial outer edge adjacent to an axial inside edges of a respective bead core in a flat position radially to the outside of the inner sidewall components. The third step of the method includes providing a pair of second bead fillers having a gum-drop shape and placing each one of the second bead fillers around a respective bead core so that a radial internal edge of the second bead filler is adjacent to a radial outer edge of the respective bead core. A fourth step includes folding the rim interface components at each lateral edge around a respective bead core and second bead filler to interface with a radial outer face of the first bead filler. A fifth step includes placing outer sidewall components having sidewall rubber components and at least one outer carcass layer around the building drum between the bead cores radially outward of the inner sidewall components and the first bead filler and lapping the at least one inner carcass layer with the at least one outer carcass layer. In a sixth step the method includes shaping said assembled components into a toroidal shape by forcing the pair of bead cores to approach one another while rotating the first bead filler and the rim interface components about each respective bead core and second bead filler.

Additional embodiments of the method for providing a cured tire for use on a vehicle comprise the further steps of: adding a belt portion and a tread rubber to a crown area of the assembled components to provide an assembled greet tire; curing the assembled green tire in a tire mold and providing a cured tire, wherein each second bead filler is positioned to have one side adjacent to the respective bead core, to extend radially outward of the respective bead core and to be bounded on by the first bead filler on the other sides of the second bead filler; and mounting the cured tire on a rim of a vehicle for transferring loads from the vehicle to a ground surface by way of the rim and cured tire for running of the vehicle. Other variations and combinations of steps can be provided, namely according to the manufacturing machines available.

BRIEF DESCRIPTION OF THE DRAWINGS

Further features of the present invention will become apparent to those skilled in the art to which the present invention relates from reading the following with reference to the accompanying drawings, in which:

FIG. 6 is a cross-sectional view of portions of one bead area of a green tire of this invention having an alternate design for a bead core and a second bead filler being placed on a tire building drum during the manufacture of the tire;

FIG. 7 is a cross-sectional view of one bead area of a cured tire of this invention showing the relative position of the bead core and the bead fillers of the alternate design of FIG. 6;

DETAILED DESCRIPTION OF THE PREFERRED EMBODIMENT

Figure 1:
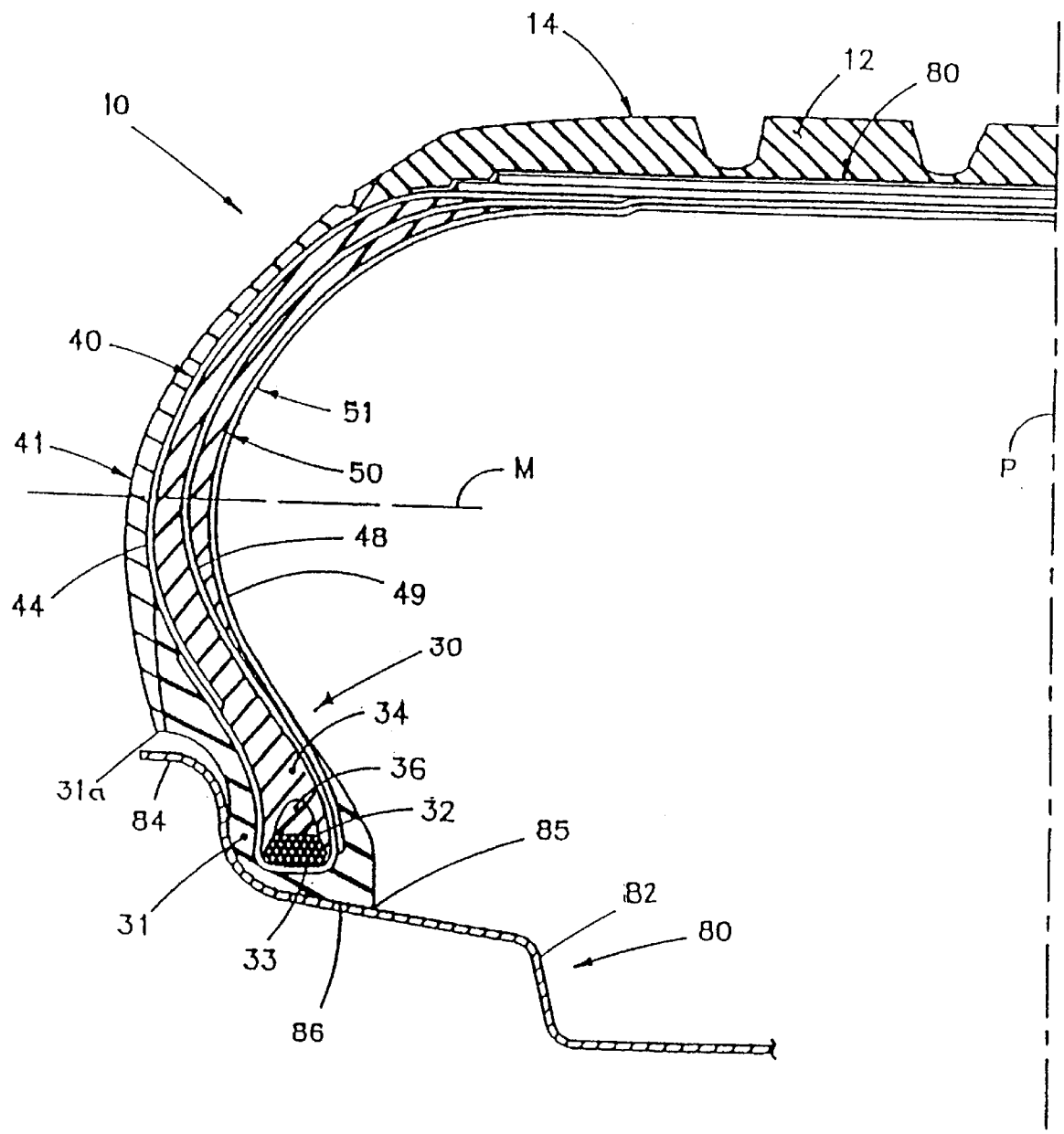
FIG. 1 is a radial cross-section view of a tire being symmetrical about a midcircumferential plane according to the invention.

A typical tire 10 made according to the present invention is illustrated in FIG. 1. The cross-sectional view of FIG. 1 is a radial cut of the tire showing only half of the tire's cross-section. The tire is symmetrical with respect to a midcircumferential plane P of the tire. The crown portion 14 of the tire includes a tread 12 having a tread surface for contacting a ground surface to support a vehicle by transferring vehicular loads from the rim through the tire to the ground surface. The tread is supported by a plurality of reinforced belt plies forming a belt package 80 in a band around the tire interior to the tread. The belt package extends laterally over the crown of the tire from shoulder to shoulder.

The sidewalls of the typical tire 10 are formed by inner sidewall components 51 and outer sidewall components 41 that include the carcass layers. The carcass layers 44 and 48 of tire 10 have a conventional rubber matrix radially reinforced with conventional parallel metallic reinforcing members or synthetic cords which extend at an angle of less than about 15 degrees from a radial plane containing the axis of rotation of the run-flat tire. Inner sidewall components 51 include an innerliner rubber 49 is provided on the inside surface for maintaining air under pressure within the run-flat tire. The inner sidewall components 51 of this tire include sidewall stiffening or protecting members 50. Sidewall stiffening members are generally made of a hard rubber material having a high modulus and hardness conventional in the art.

Figure 2:
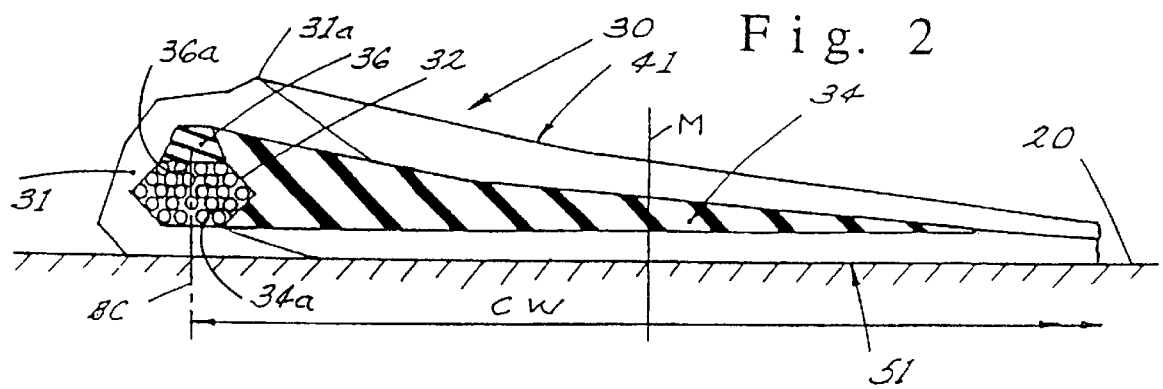
FIG. 2 is a cross-sectional view of portions of one bead area of a green tire of this invention being placed on a tire building drum during the manufacture of the tire.
Figure 3:
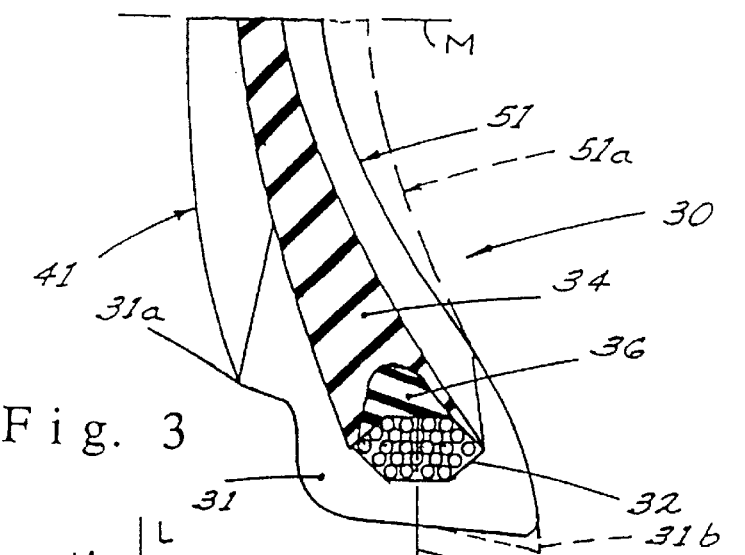
FIG. 3 is a cross-sectional view of one bead area the cured tire of this invention showing the relative position of the bead core and the bead fillers.
Figure 4:
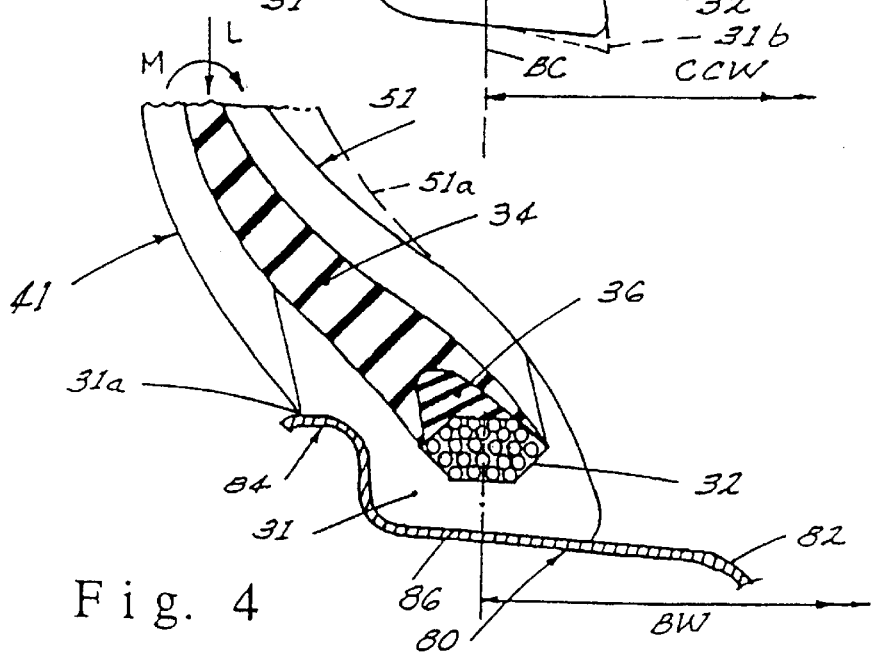
FIG. 4 is a cross-sectional view of the cured tire of FIG. 3 being mounted on a rim and subjected to vehicle loadings typical for a run-flat tire having lost its inflation pressure.

The bead core 32 of the bead area 30 is preferably made with a plurality of layers formed by an annular coil of wire or synthetic cord filaments nestled together, as illustrated in FIGS. 2–4. The position of the bead core of a cured tire with respect to the rim 80 on which it is to be mounted is critical for mounting the run-flat tire and keeping the tire seated on the rim with a loss of inflation pressure within the run-flat tire (FIG. 4).

The typical tire of FIG. 1 made according to this invention has been mounted on a conventional rim 80. The rim diameter is generally larger than the diameter of the bead area for all tire sizes. As the tire is placed on the rim, the tire is over-inflated as it is forced axially outward over a drop center portion 82 of the rim and onto the rim seat 86. Rim interface components 31 of the tire contact the rim seat of the rim and the tire is seated. The interface components are compressed against rim seat 86 of rim 80 to provide a seal to retain air in the tire. A rim flange 84 of the rim generally does not contact the mounted tire heel corner 31a, but is used as a fulcrum for tools to help in mounting the tire on the rim.

The unique bead filler of this invention is made in two parts to improve the manufacturing process in obtaining a good bond with bead core 32. A first bead filler 34 extends radially outward into the sidewall area 40. A second bead filler 36 has a gum drop cross-sectional shape and is placed radially outward of the bead core to provide a softer more resilient material having a lower modulus adjacent the bead core. The soft second bead filler 36 improves the manufacturing process when forming the green tire into a toroidal shape from the cylindrical shape on a building drum and decreases the effort required to mount the tire on a rim.

The tire of this invention is suited to be used on as a run-flat tire with the addition of crescent shaped reinforcing members 50 in the tire's sidewalls. The run-flat tire of this invention has been simplified by using only a limited number of inner and outer sidewall components 51 and 41 respectively and components in the bead areas 30 of the run-flat tire. The size and shape of the run-flat tire bead area impacts the ability of run-flat tire to be mounted on the conventional rim and to remain on the rim with a loss of inflation pressure. The use of materials for the various components of the bead area of the run-flat tire of this invention further enhances the tire's performance.

A bead areas 30 for the tire of this invention have also been designed to work with a run-flat tire having sidewall stiffening members 50 and a plurality of carcass layers. The run-flat tire illustrated in FIG. 1 has a sidewall stiffening member in each sidewalls plus first bead fillers 34 extending radially into each sidewall area 40 to further providing another stiffening member in the sidewall. Stiffening members extend from the bead area radially outward into the sidewall to terminate below the lateral edges of the bead package 80 for supporting loads on the rim from a ground surface when the run-flat tire is mounted on the rim. There are two carcass layers illustrated to including one inner carcass layer 48 and one outer carcass layer 44. Additional carcass layers can be added adjacent to the two layers shown. The carcass layers are disposed along with the sidewall stiffening member and the first bead filler in forming the run-flat tire 10.

The first bead filler 34 in each bead area 30 for the tires of this invention are preferably made to have a Shore A hardness with a value in the range of about 70 to 90 and a Modulus of Elasticity at ten percent unit strain with a value in the range of about 7 MegaPascals (MPa) to about 15 MPa. The second bead filler 36 is made to have a hardness and a modulus less than the modulus of the first bead filler. The second bead filler has a Shore A hardness value in the range of about 20 to about 40 and a Modulus of Elasticity in tension at ten percent strain with a value in a range of about 3 MPa to about 10 MPa.

The second bead filler 36 illustrated in FIG. 3 is smaller and softer than the first bead filler 34 for providing advantages in forming a green run-flat tire during the tire building process. The use of a second bead filler 37 having a softer material with more flexibility than the first bead filler helps with both mounting the run-flat tire on the rim and in the tire fabrication process. In addition, the performance of the run-flat tire can be improved during running of the vehicle by the addition of the second bead filler. The second filler has a preferred gum-drop shape in the embodiment shown. The cross-sectional length and width of the second bead filler can vary to enhance making the run-flat tire and its use with a vehicle. The second bead filler is totally bounded by the first bead filler and the bead core in the cured run-flat tire of this invention.

Another advantage of the addition of a second bead filler in accordance with this invention is realized when a cured run-flat tire is being mounted on a rim. The flexibility of the softer second bead filler allows the bead core to be more compliant with the stiffened sidewalls of the run-flat tire. The bead core becomes deformed or deflected from its annular ring shape as the run-flat tire is being mounted. The ability to easily mount the run-flat tire on the rim and keep bead area 30 seated on rim 80 with a loss of inflation pressure within the run-flat tire is critical. This ability is partially controlled by the relative radial stiffness of sidewalls of the tire as they are being forced to deflect laterally and radially when mounting the tire on the rim. The bead core is restrained less by the softer more resilient rubber material of the second bead filler during mounting, so that the forces and overpressures used to mount the run-flat tire are reduced as a result of the second bead filler.

The run-flat tire of this invention is made to have a predetermined initial inflation pressure for seating the tire on the rim when the run-flat tire is being mounted. The initial inflation pressure for run-flat tire 10 has an average value in a range of about 30 pounds per square inch (psi) to about 40 psi. The interfacing surfaces of the tire's interface components 31 and rim seat 86 of the rim are usually lubricated to reduce the effort in mounting the run-flat tire on the rim. The toe point 85 of the bead is to become positioned on the rim so that uninterrupted contact is made between the run-flat tire and the rim when the run-flat tire is fully mounted on the rim. A resilient second bead filler 36 along with the first bead filler 34 provides the necessary flexibility for mounting the tire of this invention.

Bead core 32 can generally be considered as a non-extensible annular ring when mounting the run-flat tire on the rim. However, some stretching of the bead core does occur when the run-flat tire is mounted on the rim and a circumferential change in length does result in a small but important change in the internal diameter of the bead core. To control these small but important changes the bead core is made to have a tensile strength at one percent of unit strain of the bead core with a value in the range of about 1100 to 3000 Newtons per square millimeter. A torsional rigidity of the bead core is also important in keeping the run-flat tire seated on the rim. The torsional rigidity is discussed and defined in a later section.

Another advantage of the addition of the second bead filler radially outward of each bead core 32 is realized during the tire building process described in this invention. The second filler helps in forming a green tire into a toroidal shape from a cylindrical shape during the tire building process. This intermediate step is included when going from the green tire of FIG. 2 to the cured tire of FIG. 3. The harder first bead fillers are initially placed on a cylindrically shaped tire building drum axially interior to respective bead cores as illustrated in FIG. 2. The softer second bead fillers 36 are placed radially outward of the respective bead cores 32. The green tire is removed from the cylindrical tire building drum and formed into a toroidal shape. During formation of the toroidal shape the first filler is rotated around the stationary bead core to become radially outward of the second filler and the bead core in each bead area 30. The second filler is made to remain stationary around the bead core as the first filler rotates. This unique tire building process has the advantage of allowing the first bead filler to easily rotate from an initial position to a rotated position. Problems associated with an elongated or odd shaped bead core are compensated by the second bead filler.

Additional advantages of the addition of the second bead filler of this invention are associated with the performance of a vehicle having the tires of this invention. Hence, the tire designer can use the design even in the case of other manufacturing machines and method s being used. The presence of the second bead filler will have an influence on the ride comfort and handling of the vehicle. The shape and extent of the second bead filler 36 interior to the first bead filler 34 in the inflated run-flat tire is optimized. With the loss of inflation pressure the run-flat tire deforms or deflects to support the vehicle through the supporting sidewalls of the run-flat tire, as illustrated in FIG. 4. The bead area along with the bead fillers bend so that the run-flat tire best conforms to the shape of the rim without displacing the bead core or greatly reducing the seating pressures at the run-flat tire to rim interface, as illustrated in FIG. 4. The ability of the bead fillers to help the run flat tire conform to the rim is enhanced by the addition of the second bead filer. Bending of the bead area is more critical during lateral maneuvers of the vehicle and cornering maneuvers of the vehicle can be improved by the addition of a second bead filler 36.

The run-flat tire of this invention running loaded with zero inflation pressure is illustrated in FIG. 4. The run-flat tire is mounted on rim 80 which is loaded by load L and moment M as the result of supporting the weight of a vehicle. The rim interface components 31 of bead 30 remain in contact with rim seat 86 and the toe point 85 remains at the rim seat. The bead core 32 has the torsional and flexural strength to keep the run-flat tire on the rim and the bead fillers 34 and 36, along with the other inner sidewall components 51 and outer sidewall components 41 have deformed as a unit to support the run-flat tire. Sidewall stiffener members and the carcass layers included in the inner sidewall components 51 along with the first bead filler 34 act as a deformed beam to transfer loads to the rim with a loss of inflation pressure. Again, the first and second bead fillers 34 and 36 provide improved resilience for allowing the run-flat tire to bend and conform to the rim flange 84. Contact between the heel corner 31*a* of the rim interface components 31 and the rim flange allows the loads on the run-flat tire to be transferred directly to the rim flange.

A further embodiment of tire 10 of this invention is realized by defining the size, strength and flexibility of the bead core 32 when the tire is designed to be a run-flat tire. As illustrated in FIGS. 2–4, the bead core is a fundamental structural component in the various stages of providing a run-flat tire, mounting the tire and supporting the tire on a rim during inflated and deflated conditions of the run-flat tire. The bead core is a stabilizing component for the tire building method. The tensile strength of the bead core is discussed above in relation to mounting and retaining the run-flat tire on a conventional rim. The ability of the bead core to resist being twisted is quantified by its torsional rigidity. The torsional rigidity of the bead core 32 is very important, particularly when maintaining the run-flat tire on the rim with a loss of inflation pressure. Torsional rigidity of bead core 32 made of a annular coil of wire filaments is realized by measuring the moment or torque required to rotate a 100 millimeter long test sample of the bead core through an angle of 2.5 degrees. The torsional rigidity of bead core 32 for the run-flat tire of this invention should be at least 100 Newton meters per radian and is preferably about 200 Newton meters per radian. In addition, the torsional moment of inertial of the cross-sectional area of the bead core is made to have a value in a range of 150 millimeters to the fourth power to about 350 millimeters to the fourth power, and preferably 200 millimeters to the fourth power.

Figure 5A:
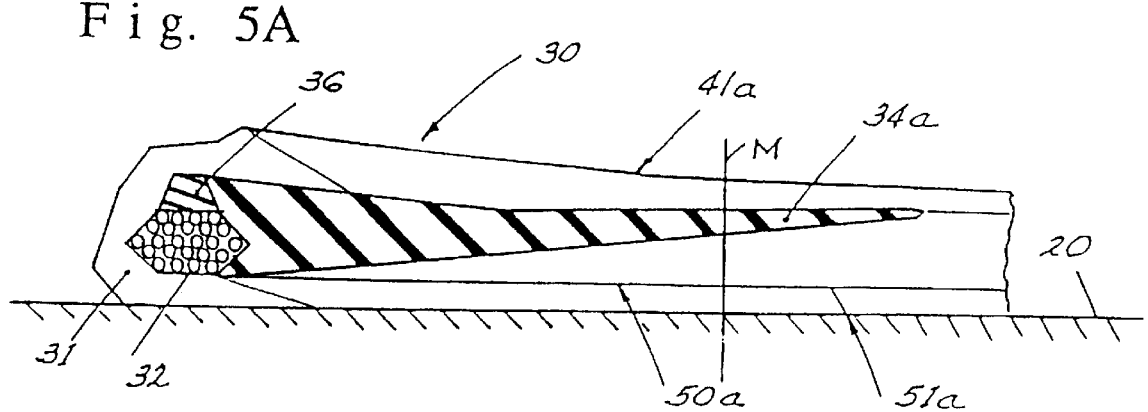
FIGS. 5A–5C are cross-sectional views of three run-flat tires showing portions of one bead area of green run-flat tires of this invention each being placed on a tire building drum during the manufacture of the run-flat tire.
Figure 5B:
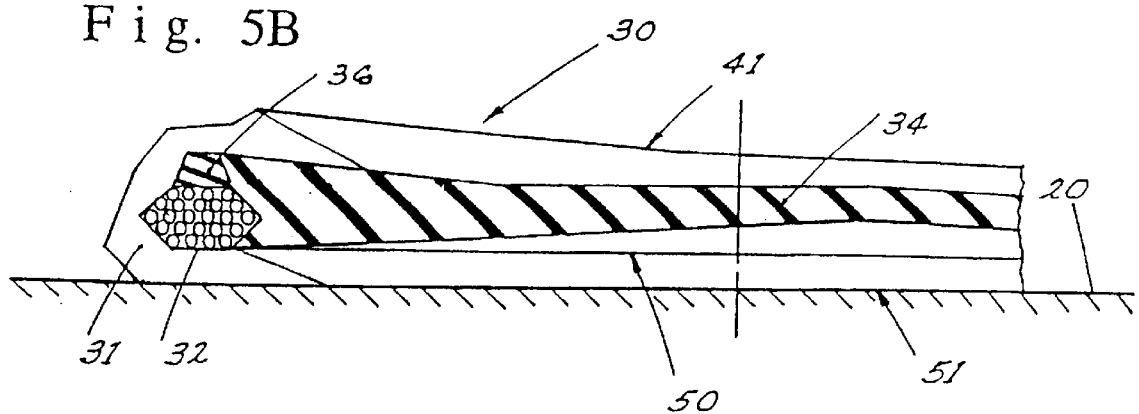
Figure 5C:
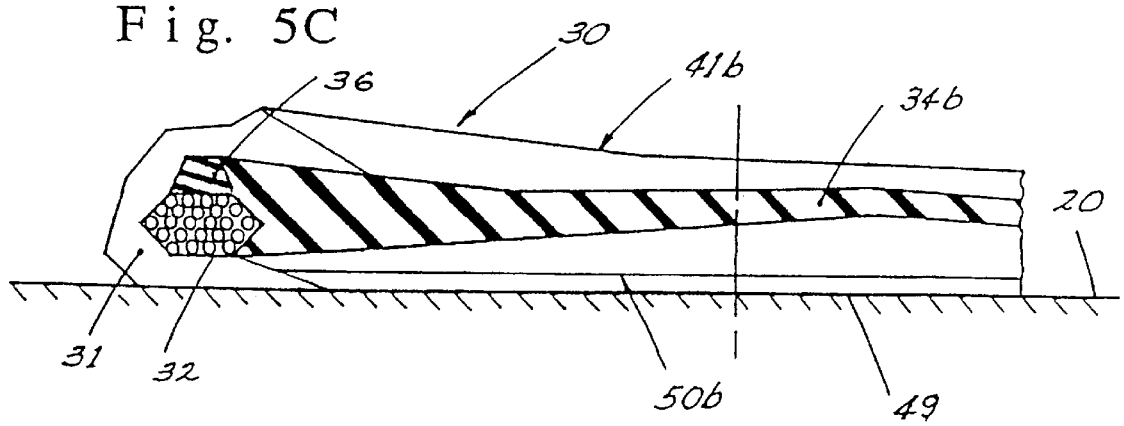

Other sidewall configurations are within the scope of this invention, including run-flat tires with two sidewall stiffening members and two inner carcass layers. Various cross-sectional configurations are formed on the building drum 20 when making the green tire to provide sidewall stiffening members, as illustrated in FIGS. 5A–5C. The first bead filler 34 is also extended in length and/or made thicker to increase the stiffening of the sidewalls. A shorter tapered first bead filler 34*a* is illustrated in FIG. 5A. The first bead filler 34 illustrated in FIG. 5B represents the first bead filler of the green tire to become the cured tire as illustrated in FIG. 1 with a single stiffening member 50. The first bead filler 34*b* illustrated in FIG. 5C is somewhat smaller than the that illustrated in FIG. 5B for use iwth larger and more complex inner sidewall components 50b. The second bead filler 36 and the bead core 32 are preferably made to be similar for each variation of the run-flat tires illustrated in FIGS. 5A–5C.

Inner sidewall components 51a, 51 and 51b shown in FIGS. 5A–5C respectively are made to illustrate a varying number of sidewall stiffening members and inner carcass layers 50a, 50 and 50b in the sidewall area 40. The inner sidewall components can include from one to three sidewall stiffening members and one, two or three carcass layers radially outside of a innerliner rubber layer 49. Typical sidewall areas of run-flat tires having inner sidewall components with multiple stiffening members and carcass layers are shown in U.S. Pat. Nos. 5,427,166 and 5,511,599. Some of the carcass layers continue from the inner sidewall component 50a, 50 and 50b to wrap around the bead core 32 and have a lapping arrangement with the outer carcass layers in respective outer sidewall components 41a, 40 and 40b. A typical lapping arrangement is illustrated in FIG. 1. The carcass layers extending around the bead core become a part of the rim interface components 31 when they are adjacent the bead core 32. The rim interface components include elastomeric rubber portions for making contact with the rim 80; including the rim flange 84 in the cured tire when running with the loss of inflation pressure (FIG. 4). The previous discussion illustrates that the bead core 32 along with the first and second bead fillers 34 and 36 of this invention are designed to be used with various run-flat tire configurations.

The shape and size of the bead core and the second bead filler can also be altered within the scope of this invention. A bead core is generally formed as a polygonal shape having a cross-sectional area defined by imaginary sides contacting the outer surfaces of the wire filaments or synthetic cords that make the annular bead core. The bead core 136 of the embodiment illustrated in FIG. 6 has an irregular polygonal shape. Other shapes and sizes of the bead core are within the scope of this invention. The inner sidewall components 151 including stiffening member 150 for providing a run-flat tire have been placed around the outer surface of the tire building drum 20. Rim interface components 131 have also been placed around the building drum. The bead core 134 is placed radially outward of the rim interface components before the rim interface components are wrapped around the bead core. A second bead filler 136 also having an irregular polygonal shape is placed radially outward of the bead core with the radial inner surface 136a of the second bead filler in contact with a radial outer side of the bead core. The first bead filler 134 is placed around the stiffening members 150 in an interior axial position with respect to the bead core, as shown by the arrow indicating the axial direction. The axial outer surface 134a of the first bead filler contacts the second bead core 136 and the bead core 132. Wrapping the rim interface components around the bead core and second bead filler completes the building drum like the one shown in FIG. 6.

The same method as previously described, although not required, can be used for obtaining a cured tire from the green tire on the tire building drum in this embodiment. The green tire of FIG. 6 is removed from the cylindrical tire building drum and formed into a toroidal shape for the addition of the belt package and the tread. The tire is cured in a mold to provide the tire of this invention. One bead area 130 of the cured tire is illustrated in FIG. 7. The bead core 132 has not rotated and the remaining tire components have rotated around the bead core, and to some extent the second bead filler 136. The gum-drop shape of the second bead filler has become elongated to extend radially outward a greater distance than the previous embodiment tire of FIG. 3. The second bead filler is again bounded by the first bead filler and the bead core according to this invention. The second bead filler of this embodiment will likely have a larger influence on the ride comfort and handling of the vehicle. This influence can vary depending on the relative stiffness of the second bead filler to the stiffness of the first bead filler. The ability of the bead area 130 of the tire of FIG. 7 to bend about a rim with the loss of inflation pressure in the run-flat tire is improved by the elongated shape of the second bead filler 136, and further by using a second bead filler which is softer more resilient material than the first bead filler for a run-flat tire.

Figure 8:
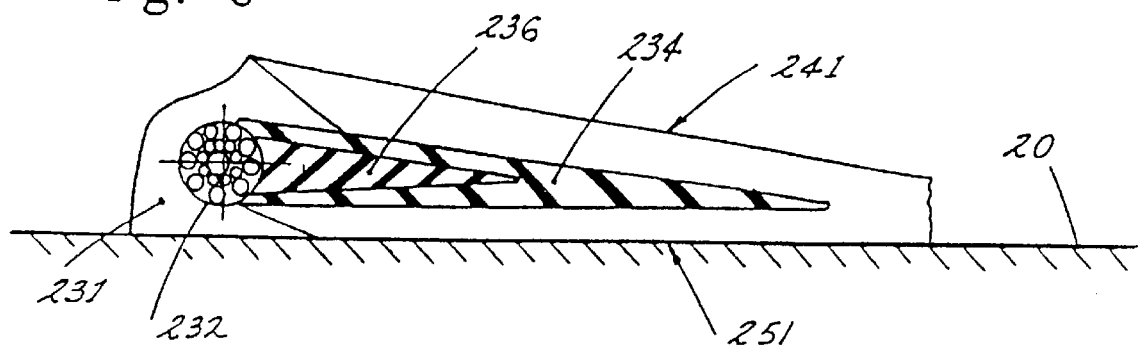
FIG. 8 is a cross-sectional view of portions of one bead area of a green tire of this invention having another alternate design for a bead core and a second bead filler being placed on a tire building drum during the manufacture of the tire.
Figure 9:
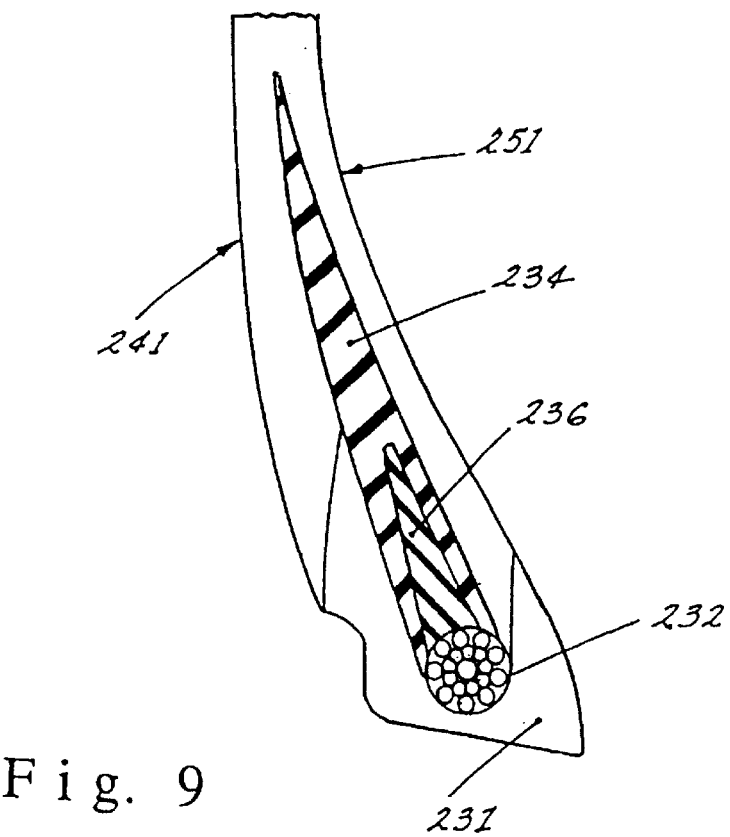
FIG. 9 is a cross-sectional view of one bead area of a cured tire of this invention showing the relative position of the bead core and the bead fillers of the alternate design of FIG. 8.

The addition of the second bead filler internal to the first bead filler according to this invention has additional benefits during running of a tire. These benefits again are associated with the performance of a vehicle having the tires of this invention. The gum-drop shape of the preferred embodiment as previously illustrated in FIG. 2 can be replaced by an elongated second bead filler 236 as illustrated in FIG. 8. The second bead filler material may be of a harder or softer rubber compound. In the case of a harder less resilient second bead filler the method of forming the tire is also modified to allow both first and second bead fillers 234 and 236 to be complexed together before placing them on the building drum 20, as illustrated in FIG. 8. The preferred bead core 232 of this embodiment has a circular or regular polygonal (i.e. hexagonal) cross-sectional area, and rim interface components 231 conform to this circular shaped bead core. The complexed bead filler with first and second bead fillers along with the rim interface components are rotated about the bead core 232 during the formation of the tire from the cylindrical shape to the toroidal shape. The crown portions are added and the tire is cured to give the bead area configuration illustrated in FIG. 9. Inner sidewall components 251 and outer sidewall components 241 are included to be similar to the preferred embodiment tire. The tire of this embodiment mounted on a rim of a vehicle has a bead area which improves the radial and lateral forces on the tire during vehicle running.

The embodiments of this invention can be used in combination or individually to form tires made by improved manufacturing processes and/or having improved performance features. The combinations depend on the intended use of the tire and includes conventional as well a run-flat tire uses. Generally speaking, the overall design of the first and second bead fillers along with the bead core of the invention disclosed herein results in a combination being an improved process for making, namely but not exclusively, run-flat tires for improving the mounting of the tire on a rim and improving driving performances of the vehicle, especially with run-flat designed tires, when inflated and with a loss of inflation pressure.

EXAMPLES

Sufficient bead retention capability of the run-flat tire of this invention have been demonstrated when used on standard vehicles. Both beads remained seated on a J-type rim with zero inflation pressure in the tire during all moderate and many severe maneuvers; including the forty five mile per hour brake and turn maneuver used in the industry as a standard for run-flat tire development. Many of the industry standard maneuvers involve lateral acceleration values in excess of 0.5 times the acceleration of gravity (0.5 Gs). The run-flat tire of this invention exceeded all of the requirements of these tests when mounted on the J-type rim.

In very severe maneuvers, with standard vehicles going well beyond standard test maneuvers, the run-flat tire with zero inflation pressure remained on the J-type rim with only the inner bead seated on the rim seat. The retention of the run-flat tire seated on at least one side of the rim enabled the vehicle to recover from a very severe maneuver and still provided the vehicle with continued mobility.

From the above description of preferred embodiment of the invention, those skilled in the art will perceive improvements, changes, and modifications. Such improvements, changes, and modifications within the skill of the art are intended to be covered by the appended claims.

What is claimed is:

1. A method for forming a tire in a tire building process from a green tire using a cylindrical tire building drum comprising the steps of:

a) providing inner sidewall components and rim interface components of the green tire including an innerliner and at least one inner carcass layer and placing said inner sidewall components and said rim interface components around an outer surface of said tire building drum, said rim interface components include elastomeric rubber portions and turn-up portions of said at least one carcass layer;

b) providing a pair of bead cores having an annular coil of wire filaments and placing said bead cores axially spaced apart in a position radially outward of respective rim interface components;

c) providing a pair of first bead fillers having an axially elongated and tapered cross-sectional shape and placing each one of said first bead fillers around the outer surface of said building drum with a short axial outer edge adjacent to an axial inside edge of a respective bead core in a flat position radially to the outside of said inner sidewall components;

d) providing a pair of second bead fillers having a gum-drop shape and placing each one of said second bead fillers around a respective bead core so that a radial internal edge of said second bead filler is adjacent a radial outer edge of said respective bead core;

e) folding the rim interface components at each lateral edge around a respective bead core and second bead filler to interface with a radial outer face of said first bead filler;

f) placing outer sidewall components having sidewall rubber components and at least one outer carcass layer around the building drum between said bead cores radially outward of said inner sidewall components and said first bead filler and lapping said at least one inner carcass layer with said at least one outer carcass layer;

g) removing said above components as assembled components of said green tire from the cylindrical tire building drum and forming said assembled components into a toroidal shape by forcing said pair of bead cores to approach one another while rotating said first bead filler and said rim interface components about each respective bead core and second bead filler;

h) adding a belt portion and a tread rubber to a crown area of said assembled components to provide an assembled green tire;

i) curing said assembled green tire in a tire mold and providing a cured tire, wherein each second bead filler is positioned to have one side adjacent to said respective bead core, to extend radially outward of said respective bead core and to be bounded by said first bead filler on the other sides of the second bead filler; and j) mounting said cured tire on a rim of a vehicle for transferring loads from said vehicle to a ground surface by way of said rim and cured tire for running of said vehicle.

2. The method of claim 1 wherein the step of providing inner sidewall components further includes providing sidewall stiffening members radially outside the innerliner, said stiffening members being disposed with said at least one inner carcass layer, wherein said cured tire becomes a run-flat tire capable of supporting said loads from said vehicle with a loss of inflation pressure within said run-flat tire.

3. The method of claim 2 wherein the added step of providing sidewall stiffening members includes providing a crescent shaped reinforcing member and a pair of inner carcass layers with one inner carcass layer disposed on each side of said crescent shaped reinforcing member.

4. The method of claim 2 wherein the added step of providing sidewall stiffening members includes providing a pair of crescent shaped reinforcing members and a pair of inner carcass layers with one inner carcass layer disposed between said two crescent shaped reinforcing members and the other inner carcass layer disposed between said crescent shaped reinforcing members and said first bead filler.

5. A radial pneumatic tire for mounting on a rim of a vehicle to sustain vehicle loads by contacting a ground surface at a contact patch of said tire, said tire comprising:

inner sidewall components including an innerliner and at least one inner carcass layer disposed to the interior of the tire to retain an inflation pressure within said tire when mounted on said rim and provide a radial carcass structure under tension when said tire is inflated;

a pair of spaced apart annular beads interconnected by said at least one carcass layer, wherein each one of said annular beads has a bead core, first and second bead fillers and rim interface components for sustaining said tire on a rim when mounted thereupon;

said bead core having an annular coil of wire filaments forming a polygonal cross-section having a predetermined tensile strength, said annular beads being spaced apart an axial distance corresponding to a width of said rim on which said tire is to be mounted;

outer sidewall components having sidewall rubber portions and at least one outer carcass layer, said at least one outer carcass layer having a lapping arrangement with said at least one inner carcass layer as one or more of said carcass layers wrap around the bead core;

said first bead fillers each being disposed radially from a respective bead core to extend radially into a sidewall area of said tire and being bounded on one side by said at least one inner carcass layer and said at least one outer carcass layer;

said second bead filler being in the form of a gum-drop having a radial inner side adjacent to said bead core and bounded by said first bead filler on the other sides of said second bead filler; and a crown portion of said tire having a belt package radially outward of said inner sidewall components and a tread for making contact with said ground surface at said contact patch for supporting said vehicle.

6. The tire of claim 5 wherein said inner sidewall components further include at least one crescent shaped reinforcing member disposed along with said at least one inner carcass layer so that said tire forms a run-flat tire for supporting the vehicle with a loss of inflation pressure.

7. The tire of claim 5 wherein said bead core has a torsional rigidity of at least 50 Newton meters per radian.

8. The tire of claim 5 wherein said first bead filler has a Shore A hardness which is greater than the Shore A hardness of the second bead filler, wherein said tire is easily mounted on said rim and becomes compliant with the rim when said tire is deflected.

9. The tire of claim 8 wherein said first bead filler has a Shore A hardness value in a range of about 70 to about 90 and said second bead filler has a Shore A hardness value in a range of about 20 to about 40.

10. The tire of claim 9 wherein said first bead filler has a Modulus of Elasticity in tension at ten percent unit strain with a value in the range of about 7 MegaPascals (MPa) to about 15 MPa, said second bead filler has a Modulus of Elasticity in tension at ten percent unit strain with a value in the range of about 3 MPa to about 10 MPa.

11. The tire of claim 5 wherein said first bead filler has a Shore A hardness value which is smaller than the Shore A hardness value of the second bead filler, wherein said tire has a higher radial and lateral stiffness values than the stiffness values of a similar tire being the same except without a second bead filler.

12. The tire of claim 11 wherein said first bead filler has a Shore A hardness value in a range of about 50 to about 80 and said second bead filler has a Shore A hardness value in the range of about 70 to about 90.

* * * * *